United States Patent
Kooriya et al.

(10) Patent No.: US 8,515,299 B2
(45) Date of Patent: Aug. 20, 2013

(54) SHEET FEEDING APPARATUS AND IMAGE FORMING APPARATUS WITH STABILIZATION CONTROL

(75) Inventors: Takaaki Kooriya, Hachioji (JP); Kimio Nishizawa, Hachioji (JP); Katsuya Toyofuku, Hino (JP)

(73) Assignee: Konica Minolta Business Technologies, Inc. (JP)

( * ) Notice: Subject to any disclaimer, the term of this patent is extended or adjusted under 35 U.S.C. 154(b) by 71 days.

(21) Appl. No.: 12/745,639
(22) PCT Filed: Jul. 23, 2009
(86) PCT No.: PCT/JP2009/063184
§ 371 (c)(1),
(2), (4) Date: Jun. 1, 2010
(87) PCT Pub. No.: WO2010/016391
PCT Pub. Date: Feb. 11, 2010

(65) Prior Publication Data
US 2011/0123211 A1    May 26, 2011

(30) Foreign Application Priority Data
Aug. 8, 2008 (JP) .................................. 2008-205863

(51) Int. Cl.
G03G 15/00 (2006.01)
(52) U.S. Cl.
USPC ............................................. 399/49; 399/72
(58) Field of Classification Search
USPC .................... 399/49, 60, 66, 72, 74
See application file for complete search history.

(56) References Cited

U.S. PATENT DOCUMENTS

| 2002/0135792 A1* | 9/2002 | Sommer et al. |
| 2005/0135822 A1* | 6/2005 | Nakagawa ....................... 399/49 |
| 2005/0185203 A1* | 8/2005 | Oki |
| 2006/0171001 A1 | 8/2006 | Kitagawa et al. |
| 2008/0019740 A1 | 1/2008 | Oouchi |

FOREIGN PATENT DOCUMENTS

| JP | 2000-318276 A | 11/2000 |
| JP | 2004-234339 A | 8/2004 |
| JP | 2006-146065 A | 6/2006 |
| JP | 2006146065 A * | 6/2006 |

(Continued)

OTHER PUBLICATIONS

International Search Report for PCT/JP2009/063184 mailed Sep. 1, 2009 with English translation.

(Continued)

Primary Examiner — David Gray
Assistant Examiner — Laura Roth
(74) Attorney, Agent, or Firm — Cantor Colburn LLP

(57) ABSTRACT

An image forming apparatus may include an image carrier for carrying a toner image and a correcting toner image, a detection sensor for detecting density information of the correcting toner image; and a controller for causing the image forming unit to correct an image forming condition based on the density information detected by the detection unit to execute a stabilization control. The image forming unit may form a plurality of correcting toner images different in density over plural non-image areas. The controller may determine which mode is set between a processing speed priority mode and an image quality priority mode. The image forming unit may continuously form correcting toner images on the image carrier in a different manner depending on the mode. The detection sensor may detect density information of the correcting toner images. The image forming unit may finish a processing operation in the stabilization control under execution.

26 Claims, 11 Drawing Sheets

(56) References Cited

FOREIGN PATENT DOCUMENTS

| JP | 2006-220826 A | 8/2006 |
| JP | 2006-220869 A | 8/2006 |
| JP | 2007-127843 A | 5/2007 |
| JP | 2007-316195 A | 12/2007 |
| JP | 2008-26699 A | 2/2008 |

OTHER PUBLICATIONS

Japanese Office Action for Japanense Patent Application No. 2008-205863 mailed Aug. 25, 2009 with English translation.

* cited by examiner

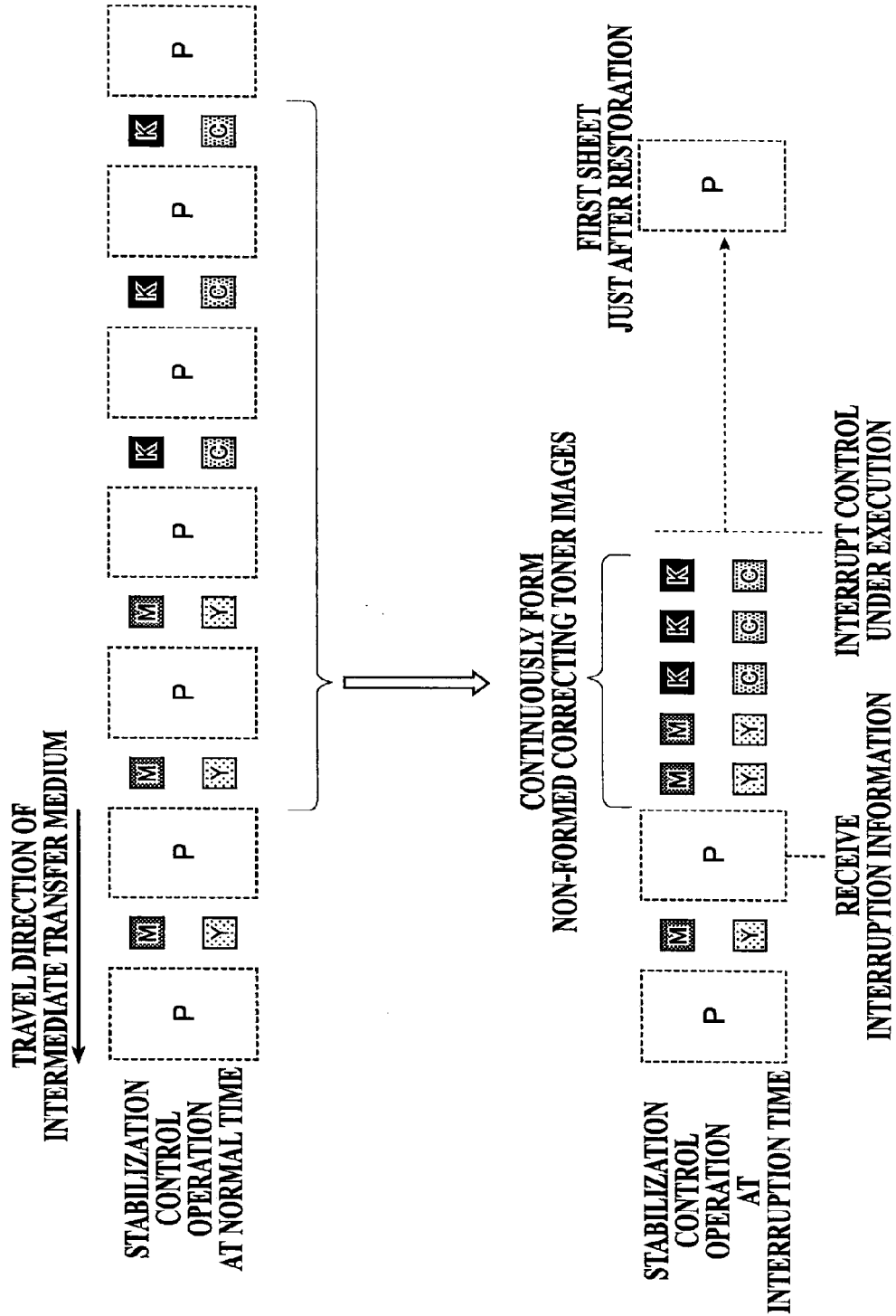

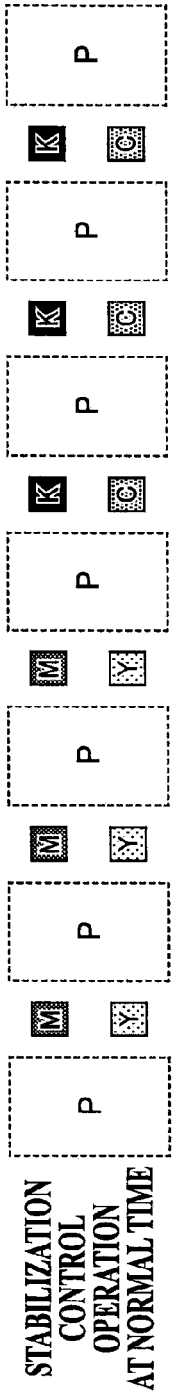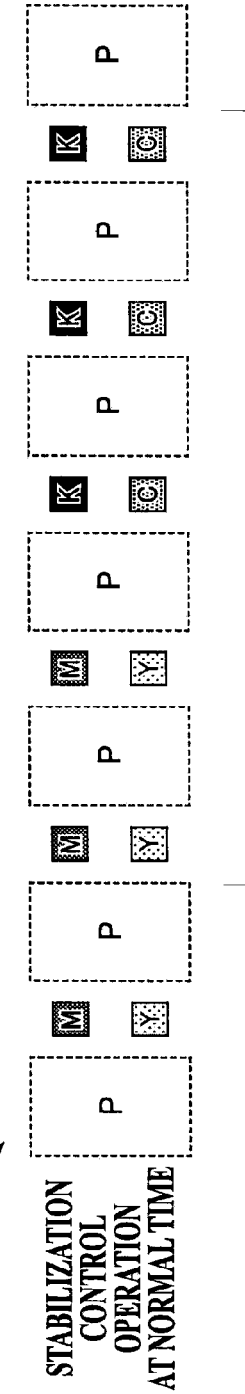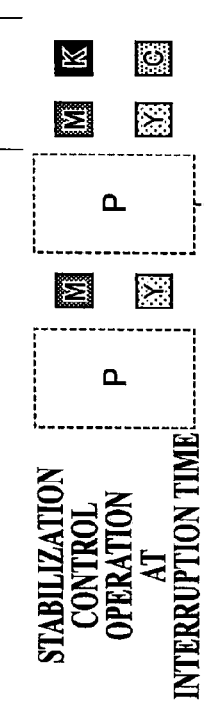

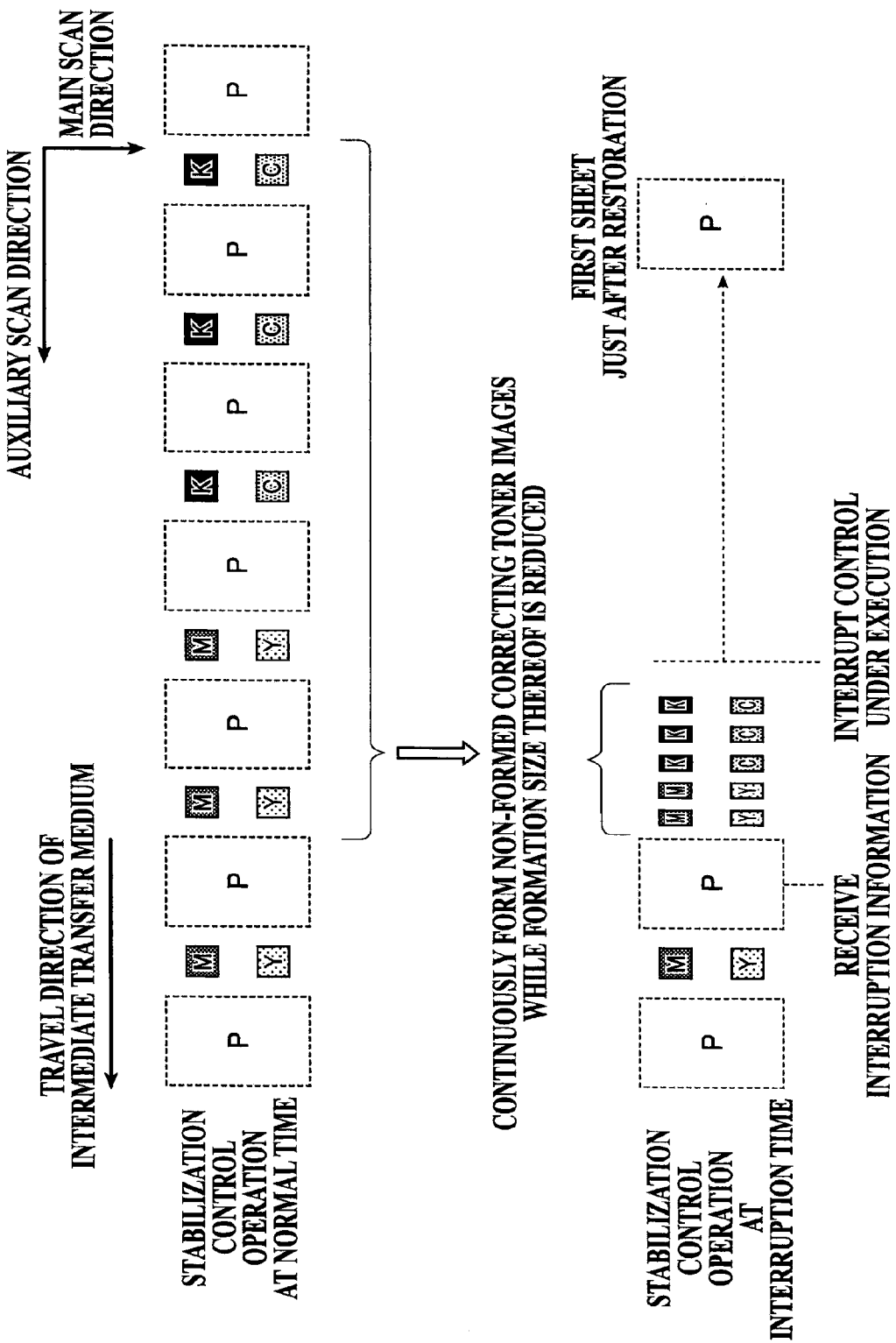

SHEET FEEDING APPARATUS AND IMAGE FORMING APPARATUS WITH STABILIZATION CONTROL

CROSS REFERENCE TO RELATED APPLICATIONS

This is a U.S. national stage application of International Application No. PCT/JP2009/063184, filed on 23 Jul. 2009. Priority under 35 U.S.C. §119(a) and 35 U.S.C. §365(b) is claimed from Japanese Application No. JP2008-205863, filed 8 Aug. 2008, the disclosure of which is also incorporated herein by reference.

TECHNICAL FIELD

The present invention relates to an image forming apparatus and an image forming method.

BACKGROUND ART

It is general in an image forming apparatus that the density of an image formed on a sheet varies in connection with variation of an environment such as temperature, humidity or the like, or deterioration of consumable goods such as toner or the like. In order to overcome such a trouble, an image forming apparatus that can perform stabilization control has recently spread. Here, the stabilization control is defined as a control operation to form an image having a stable density by correcting an image forming condition.

There has been disclosed a printer in which an image for measurement is formed on a non-image area unused for image formation on an image carrier and a density characteristic thereof can be measured and corrected on the basis of the information of the thus-formed image for measurement (see JP-A-2000-318276).

Furthermore, there has been disclosed an image forming apparatus in which when the stabilization control being executed is interrupted, only unfinished stabilization control is executed without executing any finished stabilization control again when the control is resumed (see JP-A-2007-316195).

DISCLOSURE OF THE INVENTION

Problem To Be Solved By the Invention

In the print apparatus disclosed in JP-A-2000-318276 and the image forming apparatus disclosed in JP-A-2007-316195, when the stabilization control is interrupted, the stabilization control is resumed after it is restored. Accordingly, there is a case where density adjustment based on stabilization control cannot be performed from the first sheet just after the stabilization control is restored, and thus image stability and productivity cannot be secured.

An object of the present invention is to provide image forming apparatus and method that can secure image stability and productivity just after restoration even when a processing operation based on stabilization control under execution is interrupted or the like.

Means For Solving the Problem

According to a first aspect of the present invention, there is provided an image forming apparatus including: an image forming unit for forming, in an image area of an image carrier, a toner image to be transferred onto a sheet and forming a correcting toner image in a non-image area of the image carrier; a detection sensor for detecting density information of the formed correcting toner image; and a controller for correcting an image forming condition based on the detected density information of the correcting toner image, wherein the controller forms a plurality of correcting toner images different in density over a plurality of non-image areas, and when receiving at least one information of interruption information, mode switching information and job switching information during execution of the stabilization control, the controller makes the image forming unit continuously form non-formed residual correcting toner images on the image carrier, makes the detection sensor detect density information of the continuously formed correcting toner images, and then finishes a processing operation in the stabilization control under execution.

According to a second aspect of the present invention, there is provided an image forming method for an image forming apparatus including an image forming unit for forming, in an image area of an image carrier, a toner image to be transferred onto a sheet and forming a correcting toner image in a non-image area of the image carrier, a detection sensor for detecting density information of the formed correcting toner image, and a controller for correcting an image forming condition based on the detected density information of the correcting toner image, the method comprising the steps of: forming a plurality of correcting toner images different in density over a plurality of non-image areas by the controller; continuously forming non-formed residual correcting toner images on the image carrier by the image forming unit when at least one information of interruption information, mode switching information and job switching information is received during execution of the stabilization control; detecting density information of the continuously formed correcting toner images by the detection sensor; and finishing processing operations in the stabilization control under execution by the controller.

Advantageous Effect of the Invention

According to the present invention, a processing operation based on stabilization control being executed can be finished after a non-formed and residual correcting toner image is continuously formed and detected. Accordingly, image stability can be secured just after restoration or just after operation switching, and thus productivity can be enhanced.

BRIEF DESCRIPTION OF DRAWINGS

The above and other objects, advantages and features of the present invention will become more fully understood from the detailed description given herein below and the appended drawings which are given by way of illustration only, and thus are not intended as a definition of the limits of the present invention, and wherein:

FIG. 6A is a conceptual diagram showing the continuous forming processing of the correction toner images;

FIG. 6B is a conceptual diagram showing the continuous forming processing of the correction toner images;

FIG. 6C is a conceptual diagram showing the continuous forming processing of the correction toner images;

BEST MODES FOR CARRYING OUT THE INVENTION

Optimum construction and operation of an image forming apparatus according to an embodiment of the present invention will be described hereunder in detail with reference to the accompanying drawings.

First, the construction will be described.

Figure 1:
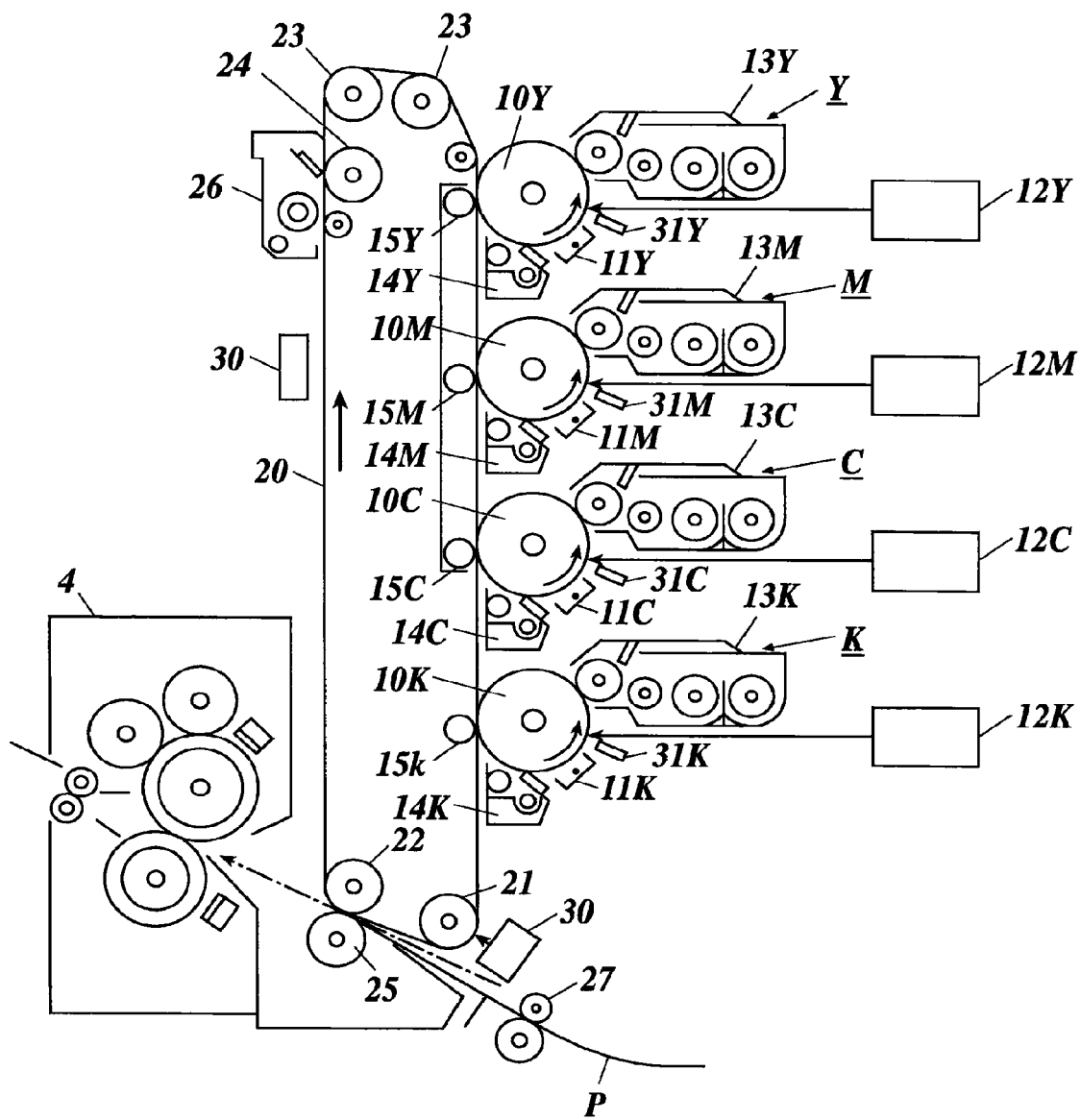
FIG. 1 is a schematic cross-sectional view showing an image forming apparatus.

FIG. 1 shows a schematic cross-sectional view showing an image forming apparatus 100.

The image forming apparatus 100 has a yellow image forming unit Y, a magenta image forming unit M, a cyan image forming unit C, and a black image forming unit K. Each of the image forming units Y, M, C, K is provided along a moving direction of an intermediate transfer medium 20.

The yellow image creating unit Y has a photosensitive member 10Y, a charging device 11Y, an exposure device 12Y, a developing device 13Y, a cleaning device 14Y and a surface potential sensor 31Y. Each of the devices is disposed along the rotational direction of the photosensitive member 10Y or around the photosensitive member 10Y.

Furthermore, the yellow image creating unit Y has a primary transfer roller 15Y at the opposite side to the yellow image forming unit Y so as to sandwich the intermediate transfer member 20 between the primary transfer roller 15Y and the yellow image forming unit Y.

An image forming process of the yellow image forming unit Y will be described.

The charging device 11Y uniformly charges the surface of the photosensitive member 10Y. The exposure device 12Y exposes the charged photosensitive member 10Y to light to form a latent image. The developing device 13Y develops the latent image formed on the photosensitive member 10Y. Through the above operation, a yellow toner image is formed on the surface of the photosensitive member 10Y.

The yellow toner image formed on the photosensitive member 10Y is transferred to the intermediate transfer medium 20 by the photosensitive member 10Y and a primary transfer roller 15Y to which a predetermined voltage is applied. A toner image to be transferred to the intermediate transfer medium 20 contains an image to be transferred to a sheet P and a correcting toner image for stabilization control. The correcting toner image is not transferred to the sheet P, but used for adjusting the density of the toner image.

The cleaning device 14Y removes the yellow toner image which is not transferred to the intermediate transfer medium 20 and thus remains on the surface of the photosensitive member 10Y.

The magenta image forming unit M, the cyan image forming unit C and the black image forming unit K have the same construction and operation as the yellow image forming unit Y, and thus the description thereof is omitted.

The difference in operation between a monochromatic mode and a full color mode will be described.

The image forming apparatus 100 switches the operation of the primary transfer rollers 15Y, 15M, 15C and 15K in accordance with the monochromatic mode or the full color mode.

In the case of the monochromatic mode, portions of the intermediate transfer medium 20 which oppose the primary transfer rollers 15Y, 15M and 15C are spaced from the photosensitive members 10Y, 10M and 10C. The primary transfer rollers 15Y, 15M and 15C are constructed by a single unit, and press-contact of the primary transfer rollers 15Y, 15M, 15c to the intermediate transfer medium 20 and release of the press-contact of the rollers from the intermediate transfer medium 20 are integrally performed interlockingly with one another.

In the case of the full color mode, all the primary transfer rollers 15Y, 15M, 15C and 15K are brought into press-contact with the intermediate transfer medium 20. Respective color toner images formed in the respective image forming units Y, M, C, K are superposed on the intermediate transfer medium 20, and a full-color toner image is formed.

The primary transfer roller 15K is brought into press-contact with the photosensitive member 10K at all times irrespective of whether the mode is the monochromatic mode or the full color mode.

The intermediate transfer medium 20 is designed to have a belt-like shape, and is suspended under tension by a driving roller 21, an earth roller 22, a tension roller 23 and a driven roller 24. The running of the intermediate transfer medium 20 is performed by rotation of the driving roller 21.

A secondary transfer roller 25 is provided so as to face the earth roller 22 through the intermediate transfer medium 20. A gap between the intermediate transfer medium 20 and the secondary transfer roller 25 serves as a passage through which a sheet P passes after it passes through a timing roller 27. By applying a predetermined voltage to the secondary transfer roller 25, a monochromatic/full-color toner image formed on the intermediate transfer medium 20 is transferred to the sheet P. The sheet P onto which the toner image has transferred is fixed by a fixing device 4.

A cleaning device 26 is provided so as to oppose the driven roller 24 through the intermediate transfer medium 20. The cleaning device 26 removes non-transferred toner which was not transferred by the secondary transfer roller 25.

A detection sensor 30 detects the density of the correcting toner image transferred to a non-image area on the intermediate transfer medium 20. In this case, the non-image area is set to a gap between sheets.

Figure 2:
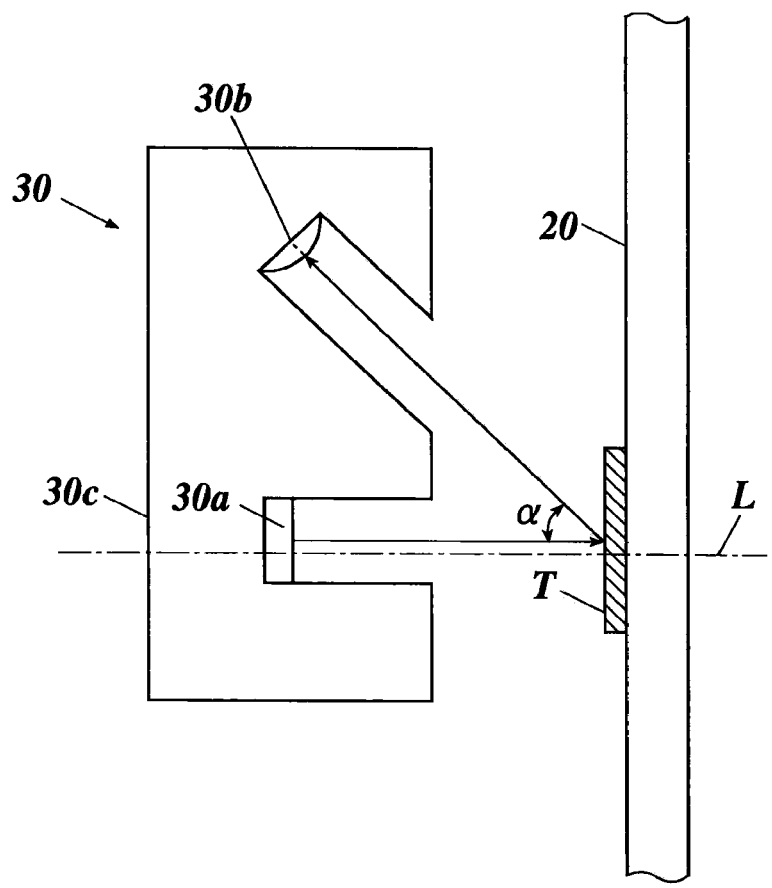
FIG. 2 is a schematic cross-sectional view showing a detection sensor.

FIG. 2 shows a schematic cross-sectional view showing the detection sensor 30.

The detection sensor 30 is disposed so as to face the intermediate transfer medium 20 and the driving roller 21, and includes an optical element 30a such as an LED or the like, a photodetecting element 30b such as a photodiode or the like, and a holder 30c.

The detection sensor 30 irradiates the correcting toner image T formed on the intermediate transfer medium 20 with an infrared light (irradiation light) by the optical element 30a, and receives reflection light by the photodetecting element 30b.

Furthermore, the detecting sensor 30 is configured so as to receive only reflection light having an angle a out of diffusely reflected reflection light when irradiation light applied along a normal line L is diffusely reflected. In this embodiment, the angle $\alpha$ is set to $\alpha=40°$, however, the angle is not necessarily limited to this value.

Figure 3:
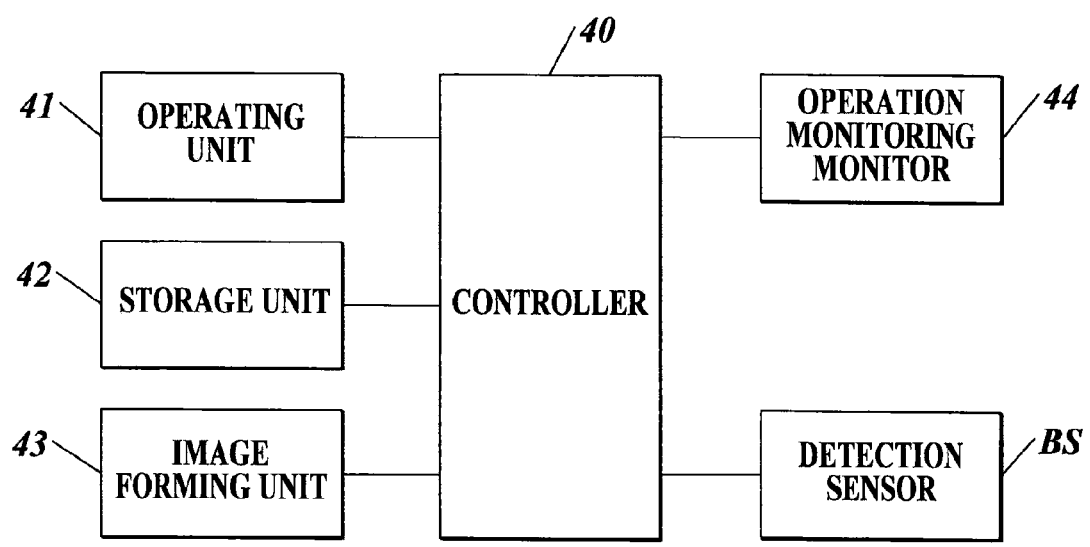
FIG. 3 is a block diagram showing the image forming apparatus.

FIG. 3 shows a block diagram showing the image forming apparatus 100.

The image forming apparatus 100 includes a controller 40, an operating unit 41, a storage unit 42, an image forming unit 43, an operation monitoring monitor 44, the detection sensor 30, etc.

The controller 40 includes a CPU (Central Processing Unit), a RAM (Random Access Memory), etc., and centrally controls the operation of each unit in cooperation with the storage unit 42.

The controller 40 executes stabilization control to perform Dmax correction, γ correction, halftone correction, dot diameter correction, registration correction, etc. The operation of the stabilization operation will be described later with reference to FIG. 4, FIG. 5A and FIG. 5B.

The operating unit 41 includes various kinds of function keys such as numerical keys, a start key, a print stop key, etc., and the operating unit 41 generates an operation signal corresponding to an operated key and outputs the generated operation signal to the controller 40.

A mode setting key which can switch a processing speed priority mode/image quality priority mode, a monochromatic mode/color mode, etc. is included in the various kinds of function keys. The processing speed priority mode is higher in productivity than the image quality priority mode.

The storage unit 42 is such as a HDD (Hard Disk Drive), a non-volatile memory or the like. The storage unit 42 stores various kinds of control programs to be executed by the controller 40, various kinds of setting information, parameters, etc. The storage unit 42 also stores density information of the correcting toner image T detected by the detection sensor 30.

The image forming unit 43 has the respective devices shown in FIG. 1, and forms in an image area a toner image to be transferred to a sheet P according to an instruction form the controller 40.

Furthermore, the image forming unit 43 forms the correcting toner image T between sheets on the intermediate transfer medium 20.

The operation monitoring monitor 44 monitors the operational state of the image forming apparatus 100 at all times, generates interruption information, mode switching information or job switching information and outputs these information to the controller 40.

The interruption information is information generated when job end, toner empty, paper out, print stop or the like occurs.

Furthermore, the mode switching information is information generated when the processing speed priority mode/image quality priority mode or the monochromatic mode/color mode is switched. The productivity is switched upon switching of the mode.

Still furthermore, the job switching information is information generated upon interruption of a job, interchange of a job.

The detection sensor 30 is includes the optical element 30a and the photodetecting element 30b shown in FIG. 2, detects the density of the correcting toner image T formed on the intermediate transfer medium 20 and outputs the detected density information to the storage unit 42.

Next, the processing operation of the stabilization control will be described.

Figure 4:
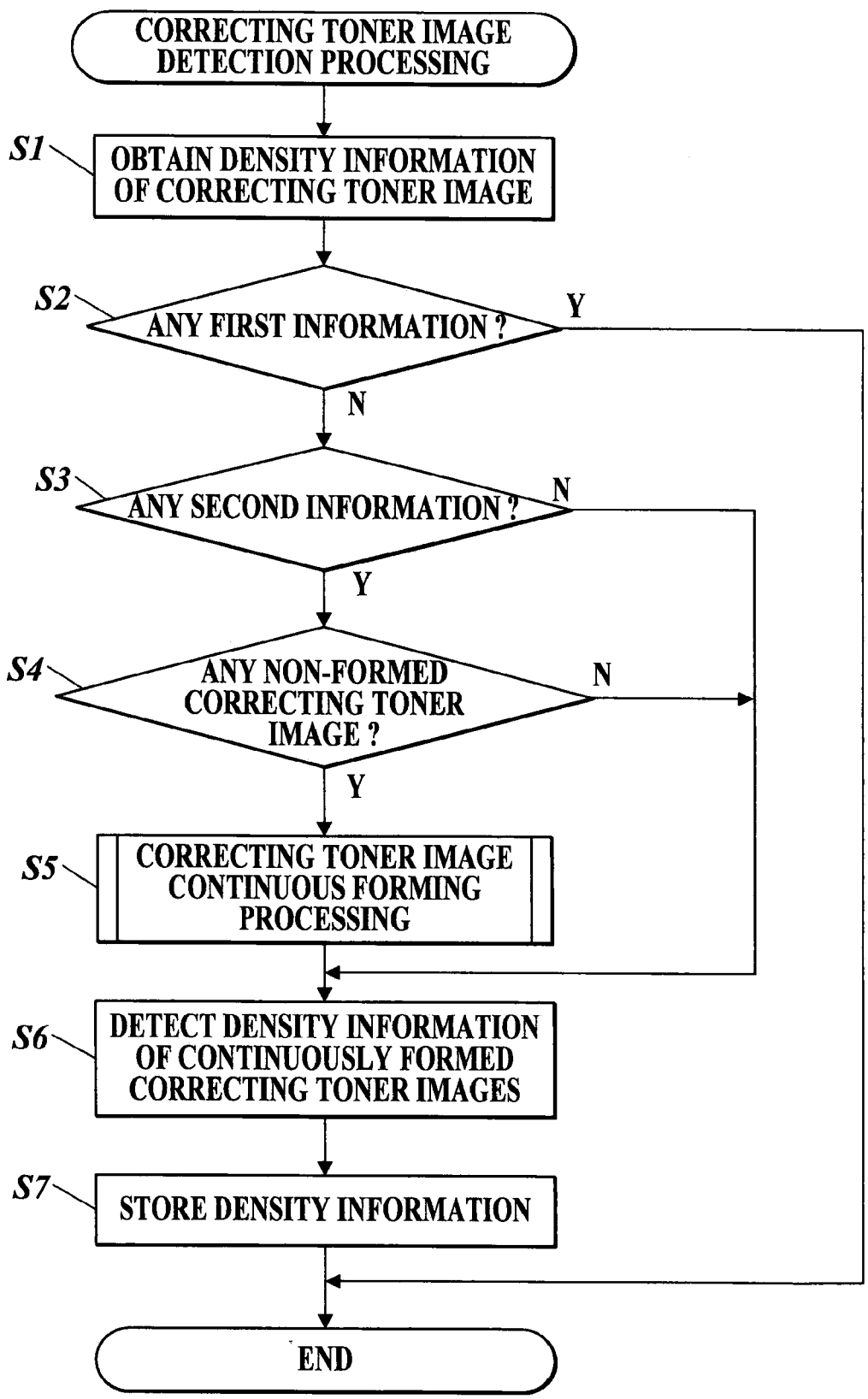
FIG. 4 is a flow-chart showing a detection processing of a correcting toner image.

FIG. 4 shows the detection processing of the correcting toner image T executed in the stabilization control.

The controller 40 makes the image forming unit 43 form the correcting toner image T, and also makes the detection sensor 30 detect the density of the correcting toner image T, thereby obtaining density information (step S1).

The controller 40 performs Dmax correction, γ correction, etc. on the basis of the obtained density information.

The controller 40 judges whether there is first information or not (step S2).

The first information is information representing emergency shutdown, and specifically, information representing jam, service call, power-off or the like (snap decision information).

When there is the first information (step S2: Y), the controller 40 finishes the correcting toner image detection processing.

When there is no first information (step S2: N), the controller 40 determines whether there is interruption information, mode switching information or job switching information (step S3).

The following description will be made while the interruption information, the mode switching information and the job switching information are collectively called as second information.

When there is no second information (step S3: N), the controller 40 shifts to step S6.

When there is second information (step S3: Y), the controller 40 executes continuous forming processing of a correcting toner image (step S5).

Figure 5A:
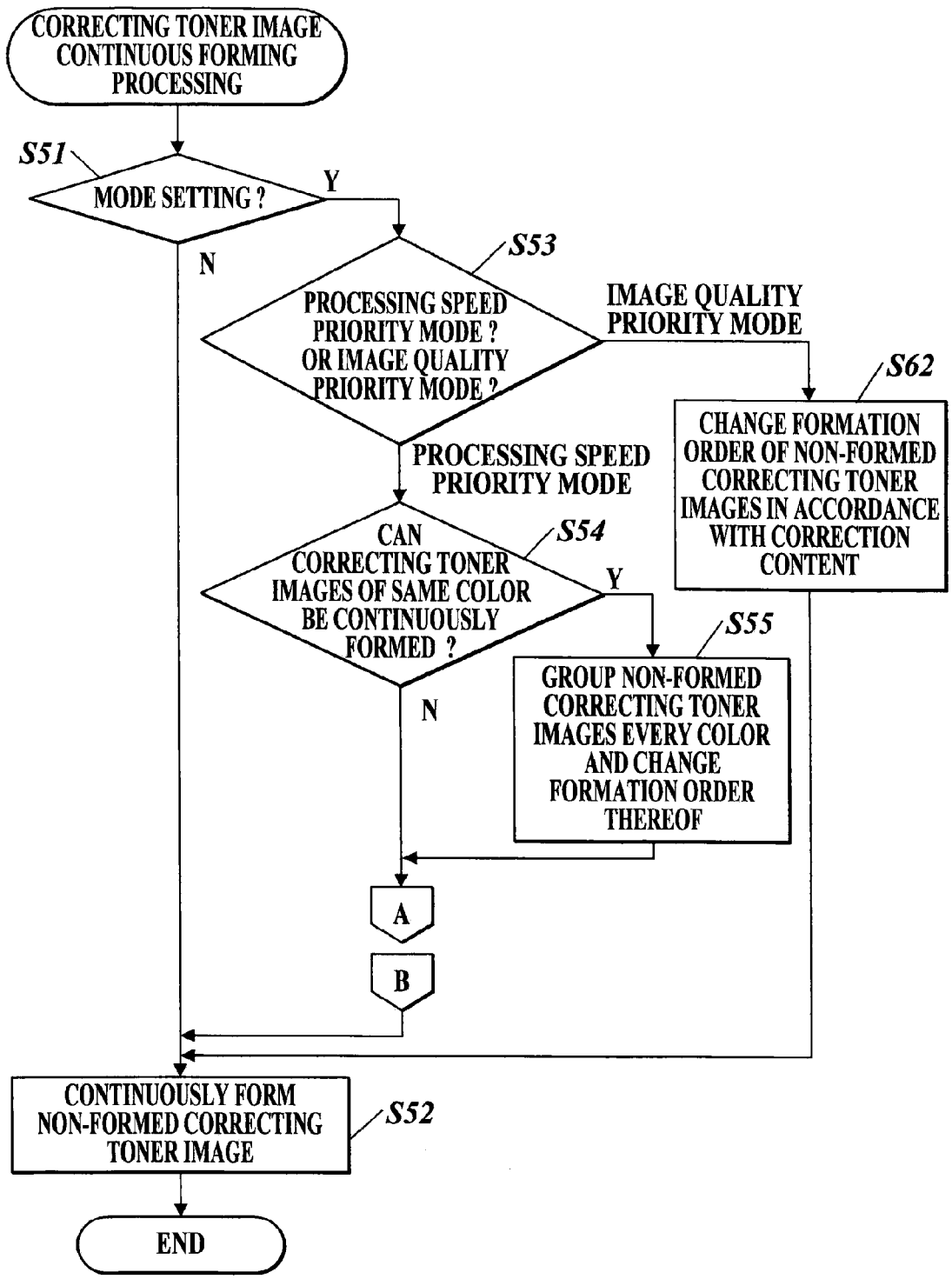
FIG. 5A is a flow-chart showing a continuous forming processing of the correcting toner image.
Figure 5B:
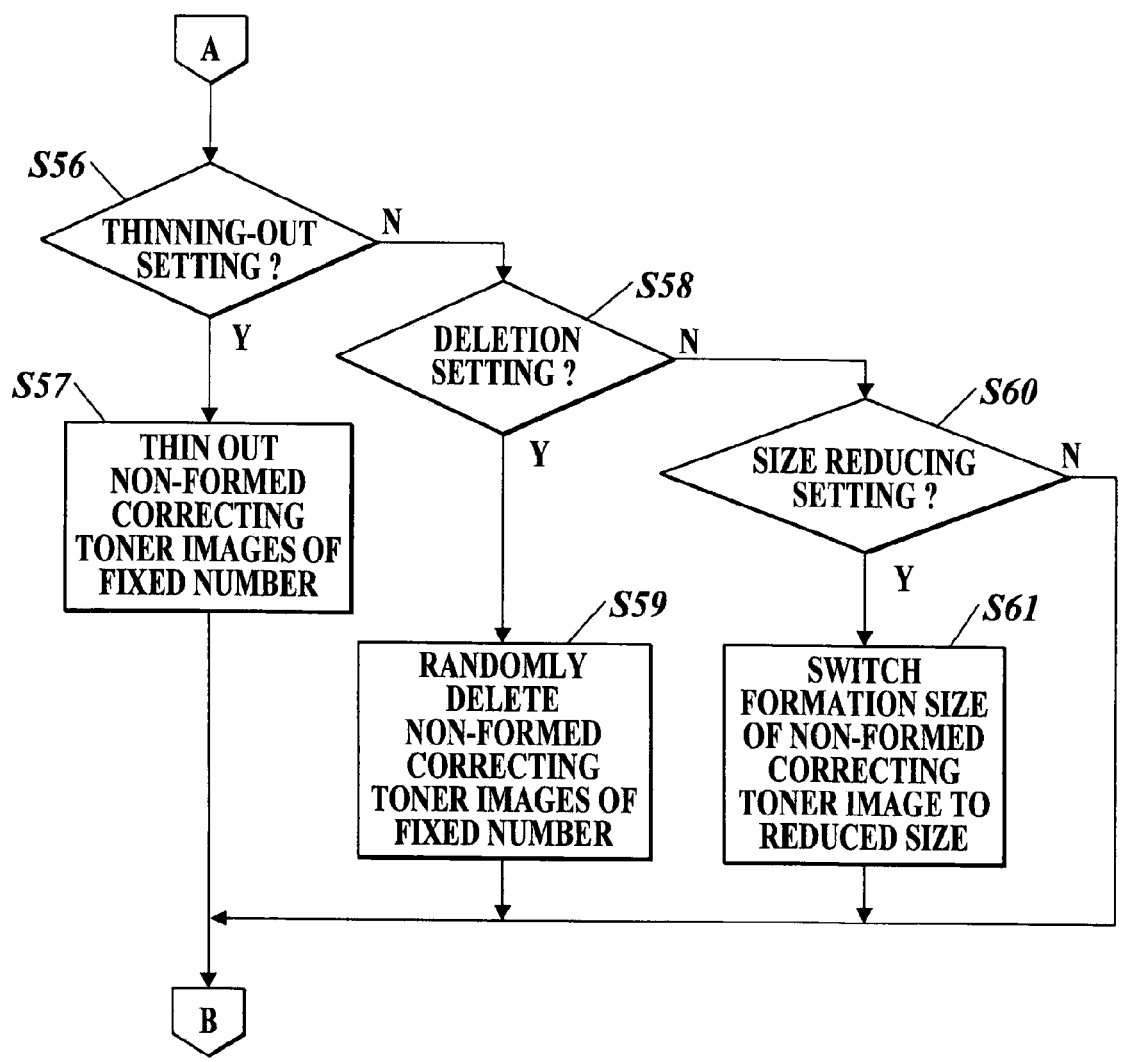
FIG. 5B is a flow-chart showing the continuous forming processing of the correcting toner image.

FIGS. 5A and 5B show the continuous forming processing of the correcting toner image T which is executed in the stabilization control.

The controller 40 determines whether there is mode setting or not (step S51).

The mode setting contains a no mode setting, the processing speed priority mode and the image quality priority mode. The processing speed priority mode contains a thinning-out setting, a deletion setting and a size reducing setting (see steps S56, S58, S60).

When there is no mode setting (step S51: N), the controller 40 continuously forms non-formed residual correcting toner images T by the image forming unit 43 (step S52), and then finishes the continuous forming processing of the correcting toner images T.

When there is the mode setting (step S51: Y), the controller 40 determines which one of the processing speed priority mode and the image quality priority mode the mode setting is (step S53).

In the case of the processing speed priority mode (step S53, processing speed priority mode), the controller 40 determines whether correcting toner images T of the same color can be continuously formed (step S54).

When correcting toner images T of the same color can be continuously formed (step S54: Y), the controller 40 groups non-formed correcting toner images T every color and changes the formation order of the non-formed correcting toner images T (step S55). Then, the controller 40 shifts to step S56.

When correcting toner images T of the same color cannot be continuously formed (step S54: N), the controller determines whether the mode setting is the thinning-out setting or not (step S56).

When there is the thinning-out setting (step S56: Y), the controller 40 executes the processing of thinning out a fixed number of the non-formed correcting toner images T (step S57). Then, the controller 40 continuously forms the non-formed correcting toner images T remaining after the thinning-out processing (step S52).

When the mode setting is not the thinning-out setting (step S56: N), the controller 40 determines whether the mode setting is the deletion setting or not (step S58).

When the mode setting is the deletion setting (step S58: Y), the controller 40 executes the processing of randomly deleting a fixed number of the non-formed correcting toner images T (step S59). Then, the controller 40 continuously forms the non-formed correcting toner images T remaining after the deletion of the fixed number of non-formed correcting toner images (step S52).

When the mode setting is not the deletion setting (step S58: N), the controller 40 determines whether the mode setting is the size reducing setting or not (step S60).

When the mode setting is the size reducing setting (step S60: Y), the controller 40 switches the formation size of the non-formed correcting toner images T to a reduced size (step S61). Then, the controller 40 continuously forms the non-formed correcting toner images T of the reduced size (step S52).

When the mode setting is not the size reducing setting (step S60: N), the controller 40 shifts to S52.

Returning to step S53, in the case of the image quality priority mode (step S53: image quality priority mode), the controller 40 executes the processing of grouping the non-formed correcting toner images T every correction content and changes the formation order of the non-formed correcting toner images T (step S62). The correction content contains a Dmax correction, a γ correction, a halftone correction, a dot diameter correction, a registration correction, etc. The formation order which is changed by grouping the non-formed correcting toner images T every correction content is predetermined, and in this embodiment, the formation order to be changed by grouping the non-formed correcting toner images T is predetermined to be changed at least in the order of the Dmax correction, the γ correction and the halftone correction.

The controller 40 continuously forms the correcting toner images T which are grouped every correction content and thus changed in formation order (step S52), and then finishes the continuous formation processing of the correcting toner images T.

Returning to FIG. 4, the controller 40 detects the density information of the continuously formed correcting toner images T by the detection sensor 30 (step S6).

The controller 40 stores the detected density information into the storage unit dd42 (step S7), and finishes the correcting toner image detecting processing.

After the correcting toner image detecting processing, the controller 40 calculates a correction amount on the basis of the density information stored in the storage unit 42, and executes the image forming processing just after the restoration on the basis of the calculated correction amount (Dmax correction amount, γ correction amount, etc.).

FIGS. 6A to 6E are conceptual diagrams showing the continuous forming processing of the correction toner images T described above.

A basic stabilization control operation of this embodiment will be described with reference to FIG. 6A.

The upper stage of FIG. 6A is a conceptual diagram showing the stabilization control operation at the normal time. In the stabilization control operation at the normal time, a predetermined number of correcting toner images T are dispersively formed over plural inter-sheet gaps. The predetermined number is generally set to about one to two.

The lower stage of FIG. 6A is a conceptual diagram showing the stabilization control operation at an interruption time. In the stabilization control operation at the interruption time, when second information (for example, interruption information) is received in the stabilization control operation at the normal time, non-formed residual correcting toner images T are continuously formed. Density information is obtained from the continuously formed correcting toner images T, and the image formation just after restoration is performed on the basis of the obtained density information.

The lower stages of Fig. A and FIGS. 6B to 6E described below are conceptual diagrams of the stabilization control operation at the interruption time, however, the same operation is executed at other times than the interruption time. Cases where the same operation is executed at other times than the interruption time are, for example, at the mode switching time or at the job switching time.

The stabilization control of continuously forming non-formed correcting toner images T after the non-formed correcting toner images T is thinned out or a fixed number of non-formed correcting toner images T are deleted will be described with reference to FIG. 6B.

The upper stage of FIG. 6B is a conceptual diagram showing the stabilization control operation at the normal time. The stabilization control operation at the normal time shown in FIG. 6B is the same as the operation shown at the upper stage of FIG. 6A.

The lower stage of FIG. 6B is a conceptual diagram showing the stabilization control operation at the interruption time. In the stabilization control operation at the interruption time, when interruption information is received in the stabilization control operation at the normal time, non-formed correcting toner images which are thinned out or deleted by a fixed number are continuously formed. Density information is obtained from the continuously formed correcting toner images T, and the image formation just after restoration is executed on the basis of the obtained density information.

The stabilization control of continuously forming non-formed correcting toner images T after the formation size of the non-formed correcting toner images T is reduced will be described with reference to FIG. 6C.

The upper stage of FIG. 6C is a conceptual diagram showing the stabilization control operation at the normal time. The stabilization control operation at the normal time shown in FIG. 6C is the same as the operation shown in the upper stage of FIG. 6A.

The lower stage of FIG. 6C is a conceptual diagram of the stabilization control operation at the interruption time. In the stabilization control operation at the interruption time, when interruption information is received in the stabilization control operation at the normal time, non-formed correcting toner images T which are reduced in formation size are continuously formed. Density information is obtained from the continuously formed correcting toner images T, and the image formation just after restoration is executed on the basis of the obtained density information.

The reduced formation size may be set to such a size that the detection sensor 30 can detect the density information. Specifically, in this embodiment, the formation size of the correcting toner images T formed through the stabilization control operation at the normal time is set to 30 [mm] in the main scan direction and 30 [mm] in the auxiliary scan direction, and the reduced formation size is set to 30 [mm] in the main scan direction and 20 [mm] in the auxiliary scan direction.

The stabilization control of continuously forming non-formed correcting toner images T after they are grouped every color and the formation order thereof is changed will be described with reference to FIG. 6D.

Figure 6D:
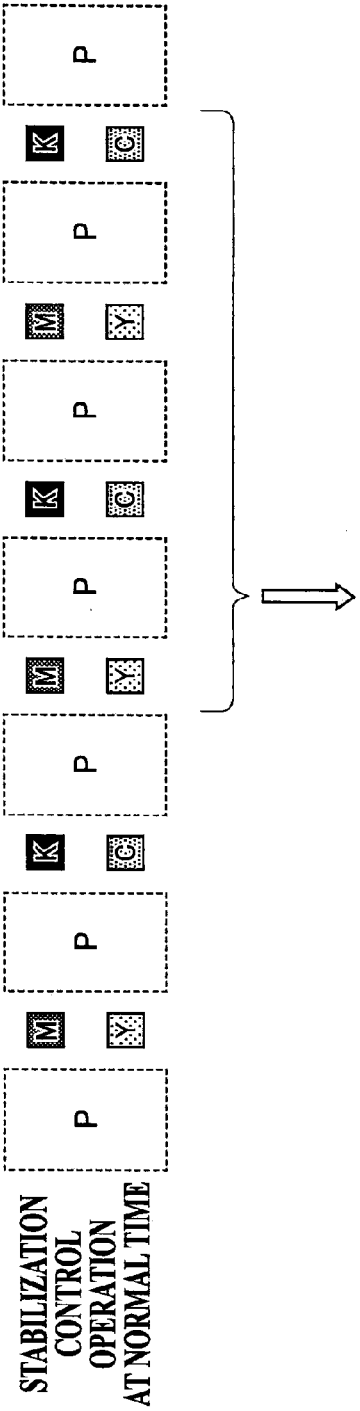
FIG. 6D is a conceptual diagram showing the continuous forming processing of the correction toner images.

The upper stage of FIG. 6D is a conceptual diagram showing the stabilization control operation at the normal time. In the stabilization control operation at the normal time shown in FIG. 6D, correcting toner images T are formed while the colors thereof are varied every inter-sheet gap.

The lower stage of FIG. 6D is a conceptual diagram showing the stabilization control operation at the interruption time. In the stabilization control operation at the interruption time, when interruption information is received in the stabilization control operation at the normal time, non-formed correcting toner images T which are grouped every color and changed in formation order are continuously formed. Density information is obtained from the continuously formed correcting toner images T, and the image information just after restoration is executed on the basis of the obtained density information.

The stabilization control of changing non-formed correcting toner images T in accordance with the correction content and then continuously forming non-formed correcting toner images T will be described with reference to FIG. 6E.

Figure 6E:
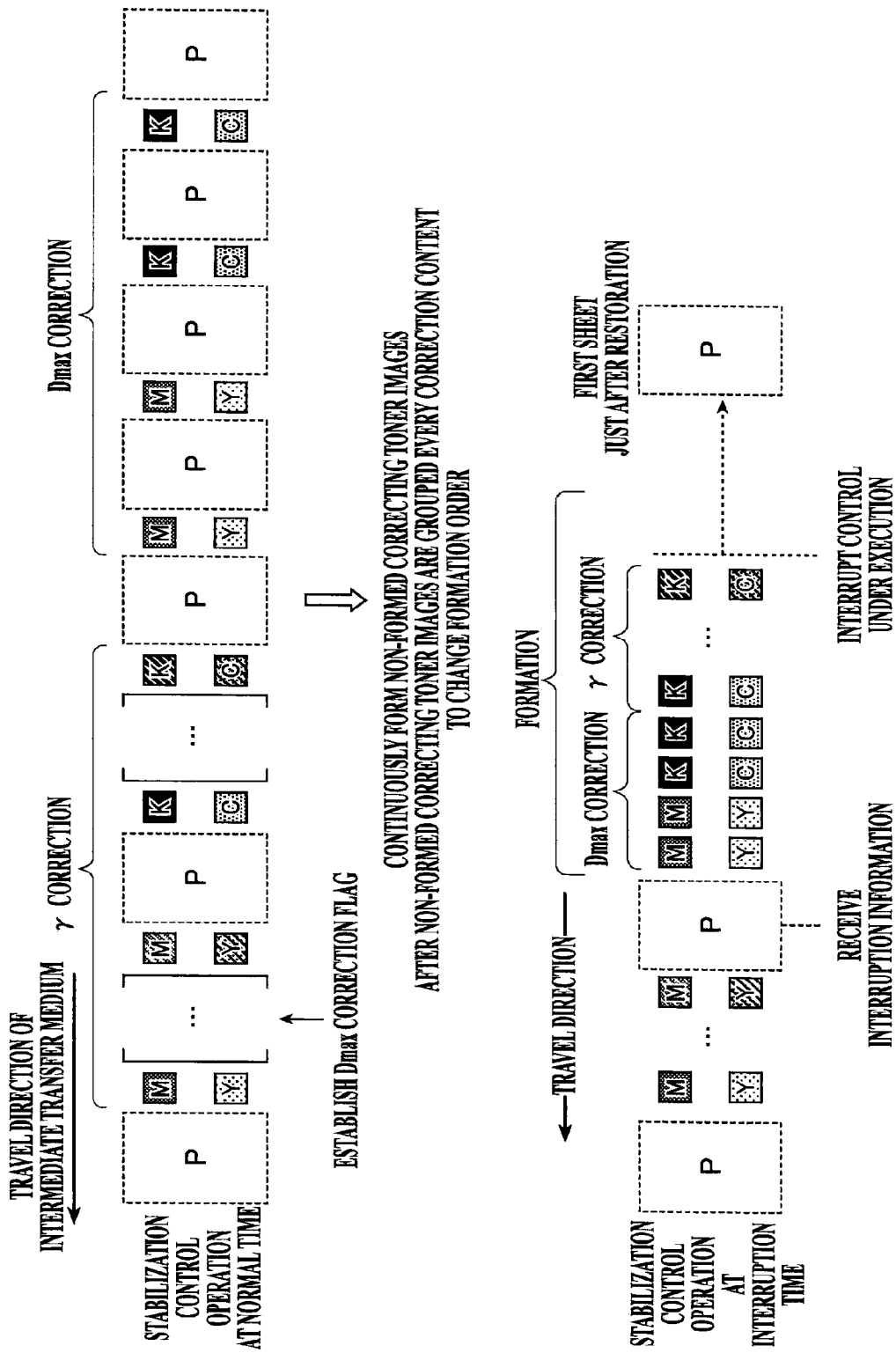
FIG. 6E is a conceptual diagram showing the continuous forming processing of the correction toner images.

The upper stage of FIG. 6E is a conceptual diagram showing the stabilization control operation at the normal time. In the stabilization control operation at the normal time shown in FIG. 6E, when a Dmax correcting flag is satisfied in the middle of formation of a correcting toner image T for $\gamma$ correction, a correcting toner image T for Dmax correction is formed after the $\gamma$ correction. However, the image formation can be originally performed at the optimum density when the $\gamma$ correction is executed after the Dmax correction is executed.

The lower stage of FIG. 6E is a conceptual diagram showing the stabilization control operation at the interruption time. In the stabilization control operation at the interruption time, when interruption information is received in the stabilization control operation at the normal time, non-formed correcting toner images T which are changed in formation order in accordance with the correction content are continuously formed. In this embodiment, correcting toner images T for Dmax correction are continuously formed, and then residual correcting toner images T for $\gamma$ correction are continuously formed. Density information is obtained from the continuously formed correcting toner images T, and the image formation just after restoration is executed on the basis of the obtained density information.

As described above, according to this embodiment, when the interruption information, the mode switching information or the job switching information is received, non-formed correcting toner images T are continuously formed, the density information is detected from the formed correcting toner images T, and then the stabilization control under execution can be finished. Accordingly, proper images can be formed just after restoration, and the image stability and the productivity can be secured.

Furthermore, the correcting toner images T can be continuously formed in the non-image areas on the intermediate transfer medium 20.

Furthermore, the non-image areas can be set to the inter-sheet gaps on the intermediate transfer medium 20.

Still furthermore, the interruption information is any one of information pieces representing job end, toner empty, out of paper P or stop of print, and when any one of these information pieces is received, the continuous forming processing of the correcting toner images T described in the above embodiment can be performed (see FIG. 6).

The mode switching information is any one of information pieces representing processing speed priority mode/image quality priority mode and monochromatic mode/color mode, and when any one of these information pieces is received, the continuous forming processing of correcting toner images T described in the above embodiment can be performed.

The job switching information is any one of information pieces representing job interrupt and job interchange, and when any one of these information pieces is received, the continuous forming processing of correcting toner images T described in the above embodiment can be performed.

When the first information (snap decision information) is received, all the processing operations in the stabilization control can be stopped.

When the second information is received and non-formed correcting toner images T are continuously formed, the correcting toner images T to be continuously formed can be thinned out or deleted by a fixed number. Accordingly, the time loss required for the control operation can be reduced.

Furthermore, When the second information is received and non-formed correcting toner images T are continuously formed, the formation size of the correcting toner images T to be continuously formed can be reduced. Accordingly, the time loss required for the control operation can be reduced.

Still furthermore, When the second information is received and non-formed correcting toner images T are continuously formed, the correcting toner images to be continuously formed are grouped every color, and thus the formation order thereof can be changed. Accordingly, the time loss required for the switching time of irradiation light applied by the optical element 30a can be reduced.

Still furthermore, When the second information is received and non-formed correcting toner images T are continuously formed, the formation order of the correcting toner images to be continuously formed can be changed in accordance with the correction content. Accordingly, the correction can be performed under the optimum image forming condition.

Still furthermore, when the formation order is changed in accordance with the correction content, the formation order can be changed to the order of the Dmax correction, the $\gamma$ correction and the halftone correction or the registration correction.

The correcting toner images T can be formed when the Dmax correction, the $\gamma$ correction, the halftone correction, the dot diameter correction or the registration correction is executed.

INDUSTRIAL APPLICABILITY

The present invention is usable in an image forming field, and it is applicable to a copying machine, a printer, a multi-functional machine, etc.

The entire disclosure of Japanese Patent Application No. 2008-205863 filed on Aug. 8, 2008 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

The invention claimed is:

1. An image forming apparatus comprising:
    an image forming unit including an image carrier for carrying an image containing a toner image to be transferred onto a sheet and a correcting toner image to be used for adjusting a density of the toner image, the image forming unit being provided for forming the toner image in an image area of the image carrier, and forming the correcting toner image in a non-image area of the image carrier;
    a detection sensor for detecting density information of the correcting toner image formed in the non-image area by the image forming unit; and a controller for causing the image forming unit to correct an image forming condition based on the density information detected by the detection unit to execute a stabilization control, wherein the controller causes the image forming unit to form a plurality of correcting toner images different in density over a plurality of non-image areas, and when receiving at least one information of interruption information, mode switching information and job switching information during execution of the stabilization control, the controller determines which mode is set between a processing speed priority mode, which puts priority on processing time, and an image quality priority mode, which does not put priority on processing time, when the controller judges the mode to be the processing speed priority mode, after the controller thins out or deletes a fixed number of correcting toner images before patch formation, or after the controller reduces a formation size of correcting toner images, or after the controller groups correcting toner images every same color to change a formation order, the controller causes the image forming unit to form correcting toner images continuously on the image carrier and when the controller judges the mode to be the image quality priority mode, after the controller changes a formation order of the correcting toner images to a predetermined order, the controller causes the image forming unit to form correcting toner images continuously on the image carrier, causes the detection sensor detect density information of the continuously formed correcting toner images, and then causes the image forming unit to finish a processing operation in the stabilization control under execution.

2. The image forming apparatus according to claim 1, wherein the image carrier is an intermediate transfer medium on which a toner image is formed.

3. The image forming apparatus according to claim 1, wherein the non-image forming area is an inter-sheet gap corresponding to a toner image formed on the image carrier.

4. The image forming apparatus according to claim 1, wherein the interruption information is any one of information pieces representing job end, toner empty, out of sheet and stop of print.

5. The image forming apparatus according to claim 1, wherein the mode switching information is any one of information pieces representing processing speed priority mode/image quality priority mode and monochromatic mode/color mode.

6. The image forming apparatus according to claim 1, wherein the job switching information is any one of information pieces representing job interrupt and job interchange.

7. The image forming apparatus according to claim 1, wherein when snap decision information representing emergency stop is received, the controller stops all processing operations in the stabilization control.

8. The image forming apparatus according to claim 1, wherein when the controller receives at least one of interruption information, mode switching information and job switching information during execution of the stabilization control, and determines the mode is the processing speed priority mode, after the controller thins out or deletes a fixed number of correcting toner images before patch formation, the correcting toner images are continuously formed on the image carrier by the image forming unit, and density information of the continuously formed correcting toner images is detected by the detection sensor.

9. The image forming apparatus according to claim 1, wherein when the controller receives at least one information of interruption information, mode switching information and job switching information during execution of the stabilization control, and determines the mode is the processing speed priority mode, after the controller reduces a formation size of correcting toner images, the correcting toner images are continuously formed on the image carrier by the image forming unit, and density information of the continuously formed correcting toner images is detected by the detection sensor.

10. The image forming apparatus according to claims 1, wherein when the controller receives at least one of interruption information, mode switching information and job switching information during execution of the stabilization control, and determines the mode is the processing speed priority mode, after the controller groups correcting toner images every same color to change a formation order, the correcting toner images are continuously formed on the image carrier by the image forming unit, and density information of the continuously formed correcting toner images is detected by the detection sensor.

11. The image forming apparatus according to claim 1, wherein when at least one of interruption information, mode switching information and job switching information is received during execution of the stabilization control, and the mode is determined to be the image quality priority mode, after the controller changes a formation order of the correcting toner images to a predetermined control order, the correcting toner images are continuously formed on the image carrier by the image forming unit, and density information of the continuously formed correcting toner images is detected by the detection sensor.

12. The image forming apparatus according to claim 11, wherein the predetermined control order is an order of Dmax correction, $\gamma$ correction and halftone correction.

13. The image forming apparatus according to claim 1, wherein the controller executes any of Dmax correction, $\gamma$ correction, halftone correction, dot diameter correction and registration correction.

14. An image forming method for an image forming apparatus including an image forming unit including an image carrier for carrying an image containing a toner image to be transferred onto a sheet and a correcting toner image to be used for adjusting a density of the toner image, the image forming unit being provided for forming the toner image in an image area of the image carrier, and forming the correcting toner image in a non-image area of the image carrier, a detection sensor for detecting density information of the correcting toner image formed in the non-image area by the image forming unit, and a controller for causing the image forming unit to correct an image forming condition based on the density information detected by the detection unit to execute a stabilization control, the method comprising the steps of:

forming a plurality of correcting toner images different in density over a plurality of non-image areas by the controller;

determining which mode is set between a processing speed priority mode, which puts priority on processing time, and an image quality priority mode, which does not put priority on processing time by the controller, when the mode is judged to be the processing speed priority mode, after a fixed number of correcting toner images are thinned out or deleted by the controller before patch formation, or after a formation size of correcting toner images is reduced by the controller, or after correcting toner images are grouped every same color to change a formation order by the controller, continuously forming the correcting toner images on the image carrier by the image forming unit, and when the mode is judged to be the image quality priority mode, after a formation order of the correcting toner images is changed to a predetermined order by the controller, continuously forming the correcting toner images on the image carrier by the image forming unit when at least one information of interruption information, mode switching information and job switching information is received during execution of the stabilization control;

detecting density information of the continuously formed correcting toner images by the detection sensor; and finishing processing operations in the stabilization control under execution by the controller.

15. The image forming method according to claim 14, wherein the image carrier is an intermediate transfer medium on which a toner image is formed.

16. The image forming method according to claim 14, wherein the non-image forming area is an inter-sheet gap corresponding to a toner image formed on the image carrier.

17. The image forming method according to claim 14, wherein the interruption information is any one of information pieces representing job end, toner empty, out of sheet and stop of print.

18. The image forming method according to claim 14, wherein the mode switching information is any one of information pieces representing processing speed priority mode/image quality priority mode and monochromatic mode/color mode.

19. The image forming method according to claim 14, wherein the job switching information is any one of information pieces representing job interrupt and job interchange.

20. The image forming method according to claim 14, wherein when snap decision information representing emergency stop is received, all processing operations in the stabilization control are stopped by the controller.

21. The image forming method according to claim 14, wherein when at least one of interruption information, mode switching information and job switching information is received during execution of the stabilization control by the controller, and the mode is determined to be the processing speed priority mode, after a fixed number of correcting toner images are thinned out or deleted by the controller before patch formation, the correcting toner images are continuously formed on the image carrier by the image forming unit, and density information of the continuously formed correcting toner images is detected by the detection sensor.

22. The image forming method according to claim 14, wherein when at least one information of interruption information, mode switching information and job switching information is received during execution of the stabilization control by the controller, and the mode is determined to be the processing speed priority mode, after a formation size of correcting toner images is reduced, the correcting toner images are continuously formed on the image carrier by the image forming unit, and density information of the continuously formed correcting toner images is detected by the detection sensor.

23. The image forming method according to claim 14, wherein when at least one of interruption information, mode switching information and job switching information is received during execution of the stabilization control by the controller, and the mode is determined to be the processing speed priority mode, after correcting toner images are grouped every same color to change a formation order, the correcting toner images are continuously formed on the image carrier by the image forming unit, and density information of the continuously formed correcting toner images is detected by the detection sensor.

24. The image forming apparatus according to claim 14, wherein when at least one of interruption information, mode switching information and job switching information is received during execution of the stabilization control by the controller, and the mode is determined to be the image quality priority mode, after a formation order of correcting toner images is changed to a predetermined control order, correcting toner images are continuously formed on the image carrier by the image forming unit, and density information of the continuously formed correcting toner images is detected by the detection sensor.

25. The image forming method according to claim 24, wherein the predetermined control order is an order of Dmax correction, $\gamma$ correction and halftone correction.

26. The image forming method according to claim 14, wherein the controller executes any of Dmax correction, $\gamma$ correction, halftone correction, dot diameter correction and registration correction.

* * * * *